United States Patent [19]
Landrum et al.

[11] Patent Number: 5,660,262
[45] Date of Patent: Aug. 26, 1997

[54] HIGH SPEED CARTON FEEDING/TURNING SYSTEM

[75] Inventors: Charles R. Landrum, Dunwoody; John J. Metraw; Eddie L. James, both of Lithonia, all of Ga.; Gregory A. Conn, Sarasota, Fla.

[73] Assignee: Kliklok Corporation, Decatur, Ga.

[21] Appl. No.: 372,536

[22] Filed: Jan. 13, 1995

[51] Int. Cl.$^6$ .................................................. B65G 47/24
[52] U.S. Cl. ........................... 198/411; 198/415; 198/416
[58] Field of Search ..................................... 198/411, 412, 198/415, 416

[56] References Cited

U.S. PATENT DOCUMENTS

| | | |
|---|---|---|
| 1,616,101 | 2/1927 | Ackley . |
| 2,984,332 | 5/1961 | Pierce, Jr. . |
| 3,047,123 | 7/1962 | McKay . |
| 3,267,637 | 8/1966 | Baker . |
| 3,306,424 | 2/1967 | Fahrenbach . |
| 3,432,023 | 3/1969 | Lucas . |
| 3,866,739 | 2/1975 | Sikorski ........................... 198/415 X |
| 4,085,839 | 4/1978 | Crawford . |
| 4,417,653 | 11/1983 | Zwezerynen . |
| 4,476,972 | 10/1984 | Bryson . |
| 4,499,990 | 2/1985 | Fishback ........................... 198/415 X |
| 4,672,792 | 6/1987 | Wallin . |
| 4,807,739 | 2/1989 | Wolf et al. . |
| 4,901,842 | 2/1990 | Lemboke et al. . |
| 5,024,317 | 6/1991 | Hemus . |
| 5,191,962 | 3/1993 | Wegscheider et al. ................. 198/415 |
| 5,316,123 | 5/1994 | Achelpohl ........................... 198/415 X |
| 5,383,760 | 1/1995 | Cawley et al. ........................ 198/415 X |

FOREIGN PATENT DOCUMENTS 2131765  6/1984  United Kingdom .

*Primary Examiner*—D. Glenn Dayoan
*Attorney, Agent, or Firm*—King & Schickli

[57] ABSTRACT

An apparatus and related method for feeding/turning successive cartons along the flow path of a packaging line is provided. An intermediate conveyor section between in-line feed and take away conveyors defines the substantially horizontal flow path. A plurality of elongated O-ring belts feed and turn the cartons. A separate side running chain having a straight operative run carries a plurality of extensible fingers; one selected finger engaging and capturing a leading corner of each successive carton to assist in turning. The O-ring belts are driven at differential speed. The combined feeding and turning action of the carton, assisted by retarding engagement of the carton corner by the finger assures positive and efficient feeding/turning of the cartons. A microprocessor is provided to control the driving of stepper/servo motors for the various components. The O-ring belts are driven by the single servo motor with a plurality of increasing size pulleys on a common shaft to provide the progressive speeds. The belts are elastomeric to provide positive gripping action along multiple lines of contact and ride in laterally spaced grooves in a flat plate. A sensor upstream of the conveyor section selectively actuates the retarding finger by an electrical solenoid for capturing the carton corner; each finger being V-shaped and mounted on a pivot pin. Each finger has depending guide fins on the outside portion for engagement with a track extending along the operative run for positioning in the retarded or extended positions.

20 Claims, 4 Drawing Sheets

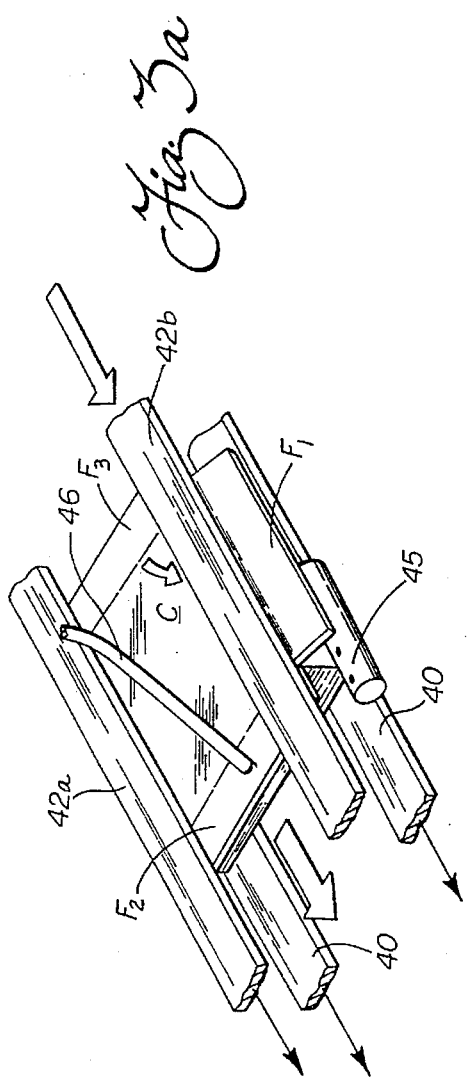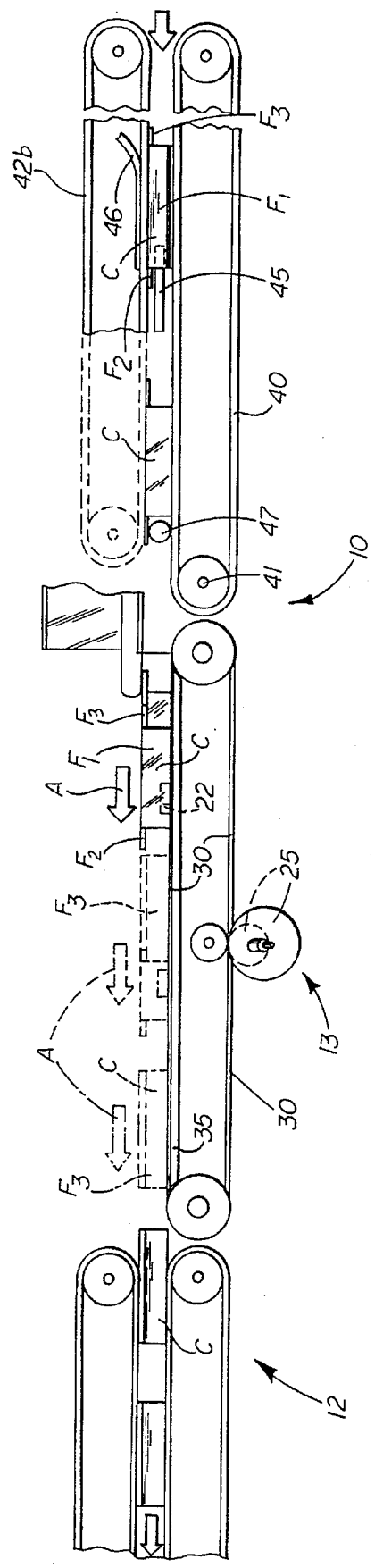

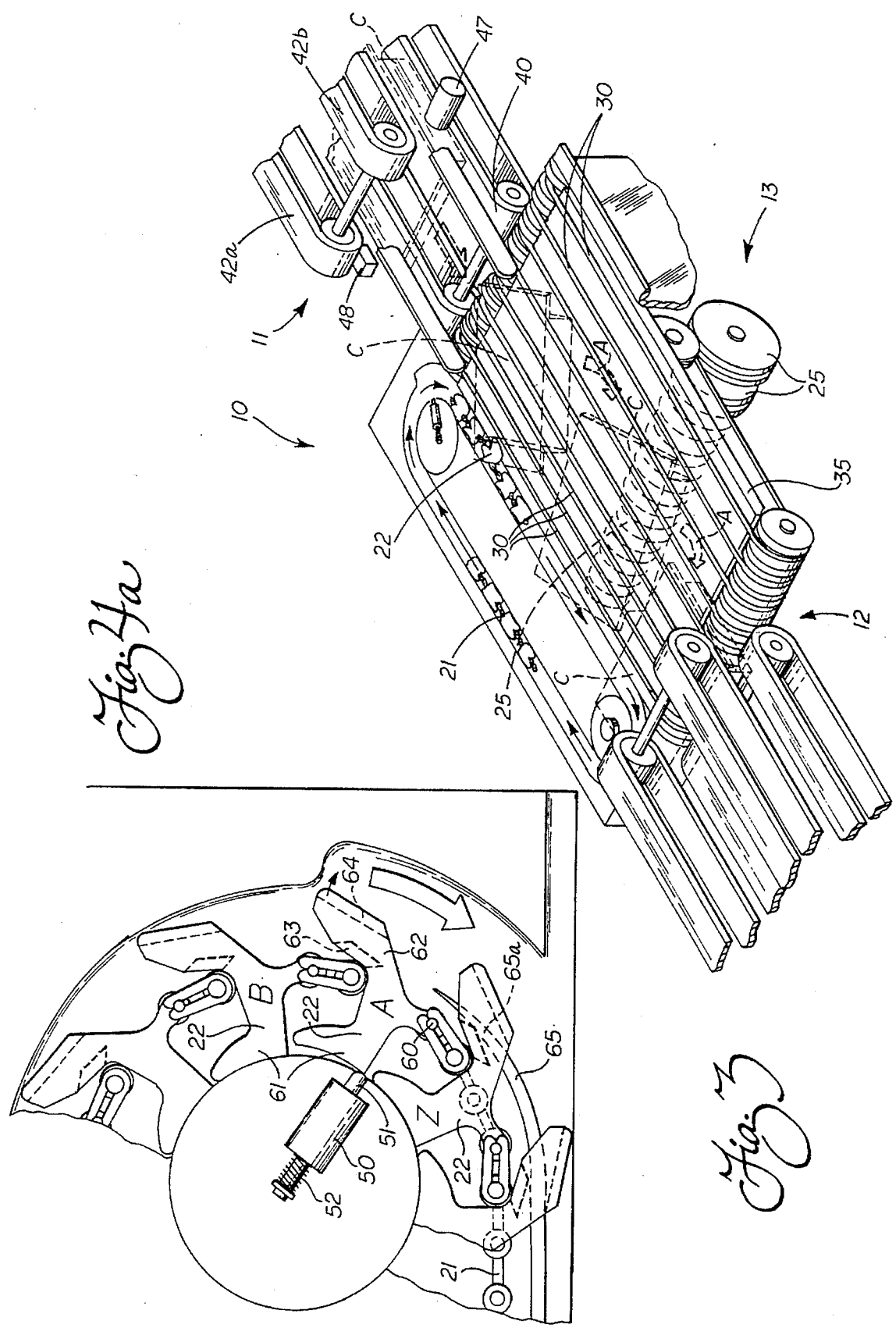

HIGH SPEED CARTON FEEDING/TURNING SYSTEM

BACKGROUND OF THE INVENTION

The present invention relates generally to handling of cartons and, more particularly to an apparatus/method for feeding and turning cartons during transition between two conveyors.

It is well known to form paper board cartons or boxes on a forming machine including a plunger and die arrangement at a first station, fill the carton at a second station through its open top and then close and seal the carton as the cartons are being transported along a series of conveyors. For many years, the most successful approach to feeding of the cartons along the entire cartoning line, including for closing and sealing, was performed by conveyors in-line with lugs or flights that are mounted on chains and move the cartons forward by pushing along the rear edge. At various transition locations along the cartoning line, it was necessary to turn the carton about its vertical axis while continuing to feed the carton forward. Usually, this turning motion was through 90 degrees and was performed in one fashion or another with the help of the lugged chains. The overall manner in which such cartons were handled for in-line continuous feeding/turning is generally shown in the pioneer Baker U.S. Pat. No. 3,267,637, owned by the assignee of the present invention. In the case of the Charlotte type carton illustrated, the front or Charlotte flap is sealed first, and then after a turn of the carton through 90 degrees, the two side flaps are sealed.

Over the years prior to this key innovation, various attempts, some reasonably successful, had been made at performing the feeding/turning operation of the cartons in an intermittent or semi-automatic operation. In one such approach, two sections of the conveyor are simply situated at right angles to one another. After the first operation is performed, the carton comes to a stop at the juncture between the two conveyors, and the second conveyor then picks up the carton and the second operation is performed. Of course, it can be recognized that this type of approach is very slow and could not compete with the basic Baker '637 continuous approach since the carton must be stopped between the two operations. Furthermore, this arrangement is generally not desirable from the standpoint of conservation of floor space.

Accordingly, over the more recent years, the technology focuses on turning of cartons without stopping, or literally on the fly, as pioneered in the '637 patent. Several approaches that have been reasonably successful employ angled guide elements, such as a flexible brush type plow to retard one side of the carton. To provide an assist for the turning function, a continuously rotating finger is timed to push the leading edge of the carton around prior to entering the take away conveyor. One such approach is illustrated in the prior patent to Bryson, U.S. Pat. No. 4,476,972, also owned by the assignee of present application. While this approach provides for continuous, in-line feeding/turning, it still requires the use of lugs or flights on the bottom feed chains to successfully carry out the operation.

In more recent years, other efforts have been made to perform the turning operation utilizing lugless conveyors, that is conveyors without the lugs. These efforts still follow the basic concept pioneered in the '637 patent, mentioned above. An example is the Wallin U.S. Pat. No. 4,672,792 wherein a Charlotte type carton moves along an infeed conveyor, the carton is then turned through 90 degrees on a flat, lugless intermediate conveyor, and then the carton is transferred to a take away conveyor. This approach relies solely on one, or a plurality of side running belts to retard a leading corner. This causes the carton to laterally scoot around on the flat belt for turning. A particular drawback of this approach is the lack of control of the carton, and thus the limited speed at which it can successfully operate.

Another approach in the packaging field is illustrated in the Hemus U.S. Pat. No. 5,024,317. This approach is very similar to the Wallin approach, but instead of using a side running belt for the turning function, a bottom running chain with upstanding L-shaped lugs that must be raised to intercept each carton is used. The conveyor has roller segments that perform the forward feed function by engaging the bottom of the carton, which feeding action is thus necessarily unreliable, since the contact is only at widely spaced points. Again the speed, but also in this instance the accuracy, of the feeding and turning operation in this prior art approach suffers.

Accordingly, a need is identified for taking the next step up in development of carton feeding and turning systems. Of particular importance is a need for improving the speed, as well as efficiency and accuracy of the carton feeding/turning operation, while at the same time maintaining the simplicity afforded by a lugless operation. An improved system wherein the feeding and turning of successive cartons along the flow path is carried out by a novel arrangement of horizontal belts laterally spaced across the conveyor section to perform both the feeding and turning operations is contemplated. In conjunction with this arrangement, it is anticipated that the turning operation is assisted by retarding means along one side of the carton flow path.

SUMMARY OF THE INVENTION

Accordingly, it is primary object of the present invention to provide a carton feeding and turning apparatus and related method to be introduced into a cartoning line, so as to overcome the shortcomings of the prior art.

It is another object of the present invention to provide a feeding/turning apparatus and method wherein the primary function is carried out by a plurality of drive elements extending longitudinally along a substantially horizontal carton flow path, with the turning function being assisted by corner engagement by a selective extensible finger.

It is another object of the present invention to provide a feeding/turning apparatus and method wherein each carton is turned about a vertical axis in a controlled and smooth fashion. The carton is simultaneously fed forward along the carton flow path and turned without abrupt speed changes. Instead, the operation is performed by applying forces representing progressive speed across the flow path, while assisting the turning function through capture and retarding of a leading corner of each carton along the edge of the flow path.

It is still another object with respect to the feeding/turning apparatus and method of the present invention to provide a system that relies upon the differential speed of the driving forces across the width of the carton, to thereby improve the efficiency of the turning action, as well as its reliability while greatly enhancing the speed of operation.

Another object of the present invention is to provide the apparatus and method for feeding and turning cartons that is readily programmable for controlling the position and orientation of the carton along the flow path, as well as maintaining the integrity of the carton and assuring squaring of the carton.

It is still another object of the present invention to provide a carton feeding/turning apparatus and related method wherein the driving of the various components is by programmed operation of individual stepper and/or servo motors, which thus can be controlled together to vary the overall speed of operation, but also can be controlled independently to adjust for different size cartons, and other contingencies of the cartoning operation.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purpose of the present invention as described herein, an improved apparatus is provided for feeding and turning successive cartons during transition along a cartoning line between in-line infeed and take away conveyors. The feeding/turning function occurs along a conveyor section defining a substantially horizontal carton flow path. A plurality of longitudinally extending drive elements move the carton forward along the conveyor section, and at the same time the elements perform the critical 90 degree turning function.

In accordance with one important aspect of the invention, the drive elements move at a differential speed across the carton flow path, thus providing the desired combined positive feeding and turning of the cartons. In the preferred embodiment, the drive elements for the cartons are operating from relatively slow adjacent the first side of the path to relatively fast along the second side, thus turning each successive carton in the line about the vertical axis in a novel, and highly efficient manner.

In accordance with another important aspect of the invention, each of the driving components of this section of the cartoning line are driven by individual variable speed motors, such as stepper and servo motors. The motors are controlled by a computer means, such as a microprocessor IBM 386 so that each of the motors can be independently controlled for optimum timing and efficient operation. The microprocessor also of course provides the capability of controlling all of the motors in concert so that the speed of the operation can be ramped up or down as desired and/or the size or type of the carton being processed can be changed. This control is preferably by pre-programmed profiles stored in the memory of the computer.

Preferably, the drive elements in the intermediate conveyor section that performs the feeding/turning operation comprise endless, elastomeric O-ring belts; each belt being driven by a separate pulley along its endless loop. The most cost effective, as well as providing the most efficient driving of the belts is by mounting a series of pulleys on a common shaft driven by a servo motor; each successive pulley from adjacent the first side of the carton flow path to the second being progressively larger in order to provide the preset differential speed pattern.

The O-ring belts are advantageously mounted so as to have their operative run seated in a flat plate formed with mating grooves running longitudinally along the flow path. The O-ring belts thus grip the bottom of the carton along a plurality of extended line contacts with the driving force along each line contact from the first to the second side of the flow path being increasingly at a higher speed. As can be seen, this provides a very efficient turning moment to the carton, which needs only be assisted by gently merging a retarding finger and a leading carton corner along the first side. It is no longer necessary to include pushing lugs mounted on underneath conveying chains in order to provide successful turning of cartons. Indeed, even in instances where the bottom of the carton exhibits a relatively low friction surface, such as in the instance where the cartons are arriving from a freezing operation, the O-ring belts assisted by the retarding finger provide accurate and reliable turning along the carton flow path.

The retarding assist finger is mounted on a side running chain wherein the operative run is substantially straight and extends along the edge of the first side of the carton flow path. An electrical kicker such as a solenoid with a rapid acting armature, is utilized to extend a selected finger into the edge of the flow path to capture the carton corner. This sequence of operation is initiated by a sensor, such as a photocell, positioned at the downstream end of the inflow conveyor with the control being provided through an integral delay means in the microprocessor.

Each finger mounted on the chain is substantially V-shaped and pivotally mounted by a pin forming an integral part of the chain. Guide fins on the finger cooperate with an elongated track extending along the operative run of the chain so as to maintain the fingers in the retracted position until such time as an arriving carton along the infeed conveyor provides a signal for activation of a selected finger to the extended position, and thus provide the retarding assist for turning that carton.

Another important aspect of the present invention concerns the need for the carton to arrive in a squared position upon entry into the flow path. To accomplish this function, the infeed conveyor of the present invention includes two parallel upper and two parallel lower feed belts. A guide means is present along the infeed conveyor, such as a bar for plowing the hinged cover down and/or a heating nozzle for activating the plastic, such as polyethylene, coating on the underneath side of the Charlotte flap. By driving at least the two upper belts by independent stepper motors, the microprocessor can independently control any skewing action generated by the guide means. In effect, the differential speed on the upper belts results in squaring each carton, to not only protect the integrity of the carton, that is, proper shaped carton, but also to insure the proper feeding/turning action along the carton flow path in the downstream intermediate conveyor section.

In accordance with the related method, each successive carton is turned along the flow path within the conveyor section by the novel approach of applying separate feeding forces of progressively increasing speed at spaced locations from a first side to a second side of the flow path. In order to assure proper turning as the carton is fed forward at high speed, a leading corner is captured and retarded by an extensible finger that moves at a slightly slower speed than the forward feeding speed of the O-ring belt immediately adjacent this first side of the flow path. Of course, the movement of the finger is timed so that the turning function is completed prior to the carton entering the downstream take away conveyor.

Another important feature of this method of carton feeding/turning in accordance with the present invention is that this composite function is carried out by engaging the bottom of the carton along substantially continuous lines at spaced locations. The differential speed induced along these lines and across the carton flow path balances the forward feed with the turning moment of the carton. Whereas previous designs have employed roller segments that provide spaced point contacts, and thus are subject to very limited driving friction, the line contact of the present invention provides the optimum feeding/turning efficiency. It has been found that the present inventive method/apparatus is also particularly smooth and predictable, even when carried out at the desirable increased speeds.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate the several aspects of the present invention, and together with the description, serve to explain the principles of the invention. In the drawings:

FIG. 2 is a side view of the feeding/turning apparatus of FIG. 1;

FIG. 3 is an overall perspective view illustrating the manner in which the cartons arrive on the infeed conveyor, are fed forward and turned along the intermediate conveyor section and enter the downstream take away conveyor re-oriented through 90 degrees, as desired;

FIG. 3A is a perspective view of a segment of the infeed conveyor of the present invention illustrating the manner in which a carton is subjected to skewing action and the correction imposed by the feed belts of this conveyor; and FIGS. 4A, 4B and 4C are sequential illustrations of the operation of the pivotal retarding finger of the side running chain for capturing the leading carton corner for assisting in the turning operation.

Reference will now be made in detail to the present preferred embodiment of the invention, an example of which is illustrated in the accompanying drawings.

DETAILED DESCRIPTION OF THE INVENTION

Figure 1:
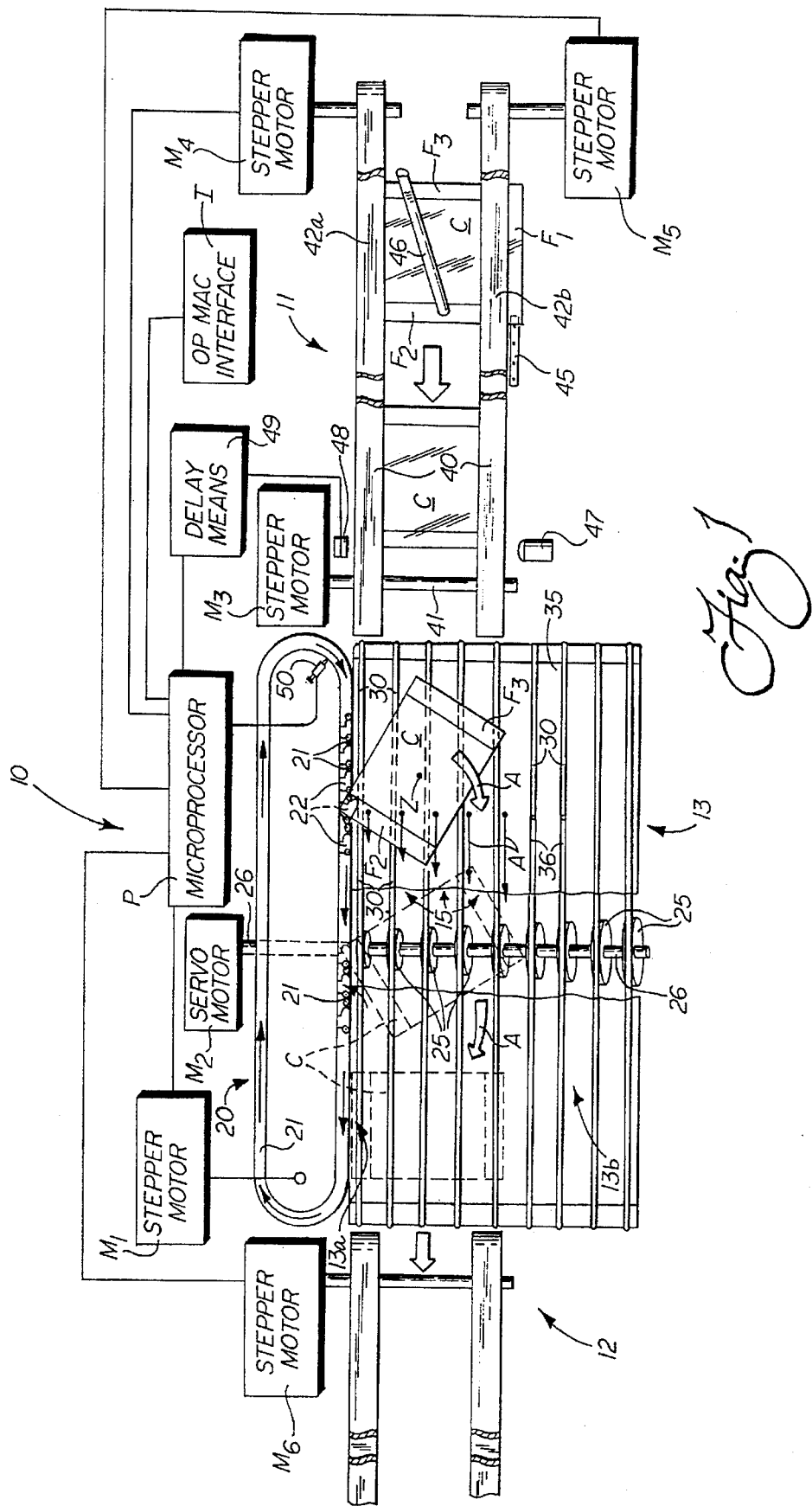
FIG. 1 is an overall plan view of the feeding/turning apparatus of the present invention and including a portion of the in-line infeed and take away conveyors, all forming a part of a cartoning line.
Figure 24B:
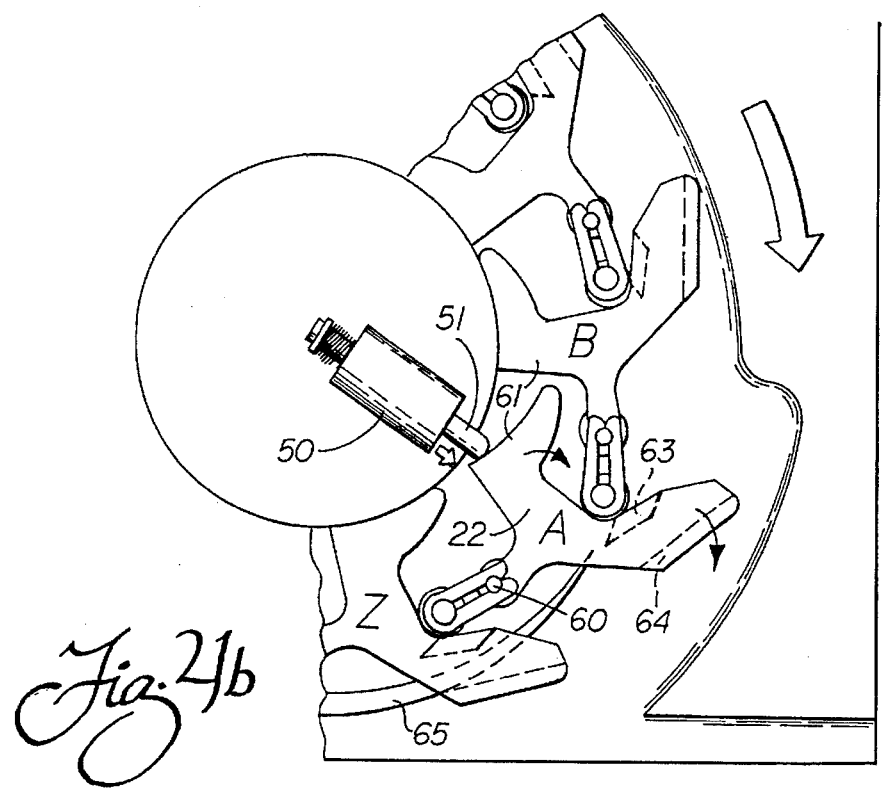
Figure 24C:
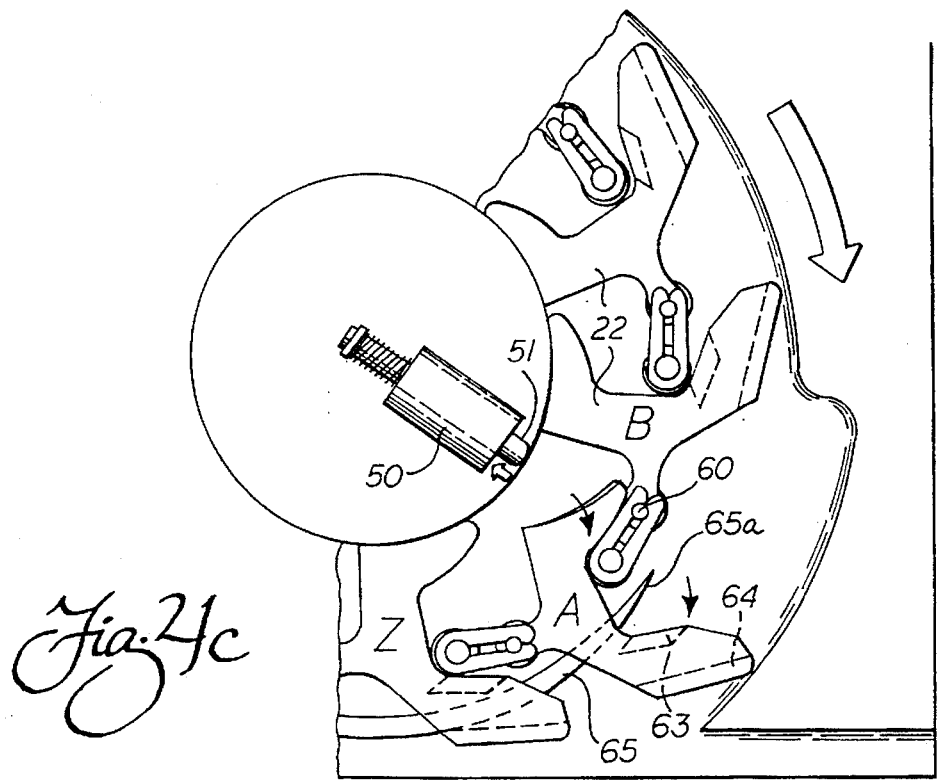

Reference is now made to FIG. 1 of the drawings showing an overall plan view of a preferred carton feeding/turning apparatus 10 of the present invention including in-line infeed conveyor 11 and take away conveyor 12 with the inventive conveyor section 13 intermediate the two conveyors 11, 12. As illustrated, the conveyor section 13 defines a substantially horizontal flow path for the cartons being closed, such as carton C. As will be recognized, the feeding/turning apparatus 10 of the present invention is particularly useful for a cartoning line of Charlotte type cartons. As illustrated, the Charlotte or front flap F is being sealed against the side of the carton body along the infeed conveyor 11; the side flaps $F_2$, $F_3$ being positioned for later sealing along the take away conveyor 12 after making the 90° turn. Of course, other types of cartons that need to be turned during processing along a cartoning line, and for any other purpose, is contemplated to be within the broad aspects for the present invention.

The flow path along the intermediate conveyor section 13 is defined by a first side, generally designated by the reference numeral 13a, and a second side, generally designated by the reference numeral 13b. It will be apparent that the conveyor section 13 is designed so as to be expandable in width depending upon the overall length of the carton that is being processed. In other words, as illustrated, if a longer carton than the carton C shown in the drawings is to be handled, the additional width illustrated can be used. Similarly, if a shorter carton is being handled, less of the width that is being illustrated used in FIG. 1 is adapted for use.

Within the carton flow path, generally defined between the two edges 13a, 13b, there is provided a plurality of drive elements, generally designated by reference numeral 15. The elements 15 are spaced laterally across the carton flow path and perform the main composite feeding/turning function of the present invention. These drive elements extend in-line with the conveyors 11, 12.

A retarding means, generally designated by the reference numeral 20, is positioned along the edge of the first side 13a of the carton flow path. As will become apparent as the description continues, its function is to gently engage an adjacent leading corner of each carton C to assist in the turning action in a very controlled and smooth way.

As best shown in FIGS. 2 and 3, the composite drive elements 15 for the carton C are provided with continuous forward motion along their operative run (note action arrows A). As illustrated, each of the elements 15 is operating at a speed different from the two adjacent elements; the drive elements 15 operating at a progressively increasing speed from the first side 13a of the carton flow path to the second side 13b.

More specifically, in order to perform the turning function about vertical axis Z of the carton C (moving in a clockwise direction when viewing FIG. 1), the elements 15 are driven at a relatively slow speed adjacent the first side 13a to a progressively faster speed across the path to a maximum speed adjacent the second side 13b.

Thus in accordance with certain broad aspects of the present invention, the drive elements 15 operating in concert are operative to controllably feed/turn the cartons C when provided with the assist of the retarding means 20 for the carton corner. The feeding/turning action is obtained without feeding lugs, or abrupt interruptions in the feed movement, that were previously recognized as being the state-of-the-art. As a result carton feeding at increased speeds of 120–150, and even up to 200 cartons per minute can be obtained on a reliable basis. In addition to providing the desired increased operating speed and the controlled accurate timing to provide the reliable operation needed, it is important to note that these objectives are obtained while moving the cartons in a smooth fashion. Furthermore, this is accomplished while maintaining the overall design of the system characterized by simplicity and attendant easy maintenance.

As best shown in FIG. 1, and in the current preferred embodiment, the retarding means 20 comprises a side running chain 21 that pivotally mounts a plurality of retarding fingers 22. As illustrated, it is important that the operative run of the side running chain 21 is in a straight line and generally corresponds to the edge of the first side 13a of the carton flow path. Each of the plurality of fingers 22 can either remain retracted, or be extended upon command, to properly perform the retarding function, as will appear in more detail below. Also of importance is the fact that the side running chain 21 extends in a loop that is substantially horizontal and parallel to the substantially horizontal plane of the drive elements 15.

A first variable speed motor $M_1$ is employed to drive the chain 21, and it cooperates in a novel fashion with a second variable speed motor, $M_2$ that serves to move the drive elements 15 in the desired differential speed pattern. A third variable speed motor $M_3$ drives the infeed conveyor 11.

The differential speed of the drive elements 15 can best be obtained by providing a plurality of increasing diameter pulleys 25 mounted on a common shaft 26 driven by the servo motor $M_2$. As illustrated, the size of the pulleys 25 varies from the smallest along the first side 13a of the carton flow path, to the largest adjacent the second side 13b. Each pulley is carefully sized so as to provide just the right amount of increased speed from one element 15 to the other, as noted generally by the different length action arrows A of FIG. 1.

In accordance with the preferred embodiment of the present invention, the drive elements 15 are preferably formed of individual elastomeric O-ring belts, specifically designated by the reference numeral 30 (see FIGS. 1 and 3 specifically). It has been discovered this particular belt functions best to provide a proper balance between positive gripping action against the bottom of the carton and the controlled sliding action required as each successive carton C turns. The relatively constant and smooth turning action obtained is a substantial advantage gained by use of the feeding/turning apparatus 10 of this invention.

In accordance with still another feature of the present invention, the conveyor section 13 is defined by a substantially flat plate 35, which includes a series of longitudinal grooves (see cut away illustration of grooves 36 in FIG. 1). As is clear, the grooves 36 receive the operative run of the O-ring belts 30 and provide positive guiding action for each belt. While the belts 30 and the plate 35 can be fabricated of various materials, the belts 30 are preferably a polyurethane plastic; whereas the plate 35 is a high density polyethylene. The belts 30/plate 35 are adapted for maximum performance over an extended life of the conveyor section 30 and are particularly adapted for easy cleaning to maintain sanitary conditions, especially in the instance where the cartons C are being used for packaging food items.

So far, it will be apparent that within the broadest aspects of the present invention, the cartons C are efficiently being turned about their vertical axis Z through 90 degrees, while at the same time being fed forwardly by the O-ring belts 30. The progressive speed across the carton flow path provides this composite function in a manner not previously attained in the carton handling prior art. At the same time, the selected extensible finger 22 is operative to capture the leading corner of the carton along the first edge 13a of the flow path. The feeding/turning operation is thus reliable and is accomplished with increased carton feeding speeds not heretofore attainable. The throughput of the entire cartoning line is thus substantially enhanced. The microprocessor P is operative to control each of the stepper/servo motors in $M_1$, $M_2$, $M_3$ either in concert to vary the overall speed of the cartoning process, or to control the motors independently in order to provide the proper timing of the carton feeding/turning operation.

With reference now to FIGS. 1–3, a more detailed review of the infeed conveyor 11 can be given. A pair of lower feed belts 40 move each of the cartons C from an upstream operating position in the cartoning line to the entry end of the intermediate conveyor section 13. These belts 40 are fabricated of plastic, such as polyurethane to provide the same type of positive gripping action as described with respect to the O-ring belts 30. These lower feed belts 40 are driven from parallel driving pulleys that are preferably mounted on a common shaft 41 of the stepper motor $M_3$.

Also engaging the top of each successive carton C to insure proper control and feed thereof, is a pair of upper feed belts 42a, 42b. Each of these belts is mounted on separate pulleys and driven individually by fourth and fifth stepper motors $M_4$, $M_5$. Each of these stepper motors $M_4$, $M_5$ is controlled in concert and/or independently by the microprocessor P, and further all in a synchronized manner with the stepper/servo motors $M_1$, $M_2$, $M_3$. Stepper motor $M_6$, also controlled by the microprocessor P, drives the belts of the take away conveyor 12 in a similar synchronized manner.

The microprocessor P is programmable through an operator/machine interface I, such as a keyboard. This feature allows each cartoning operation for each type carton to move any one of the stepper motors $M_3$, $M_4$, $M_5$ so as to maintain the desired integrity, as well as the desired positioning of each successive carton C. In other words, any one of the stepper motors $M_3$, $M_4$, $M_5$ can be adjusted as to speed so that the carton C is fed in the proper manner. This is important for obtaining a proper seal, such as for the Charlotte flap $F_1$, as well as to assure arrival in a squared position for proper entry into the conveyor section 13.

For example, the infeed conveyor 11 may be provided with a hot air nozzle 45 for activating adhesive on the underside of the flap $F_1$, and likewise provided with a hold-down plow 46 for the hinged cover positioned over the carton C. These two ancillary components of the cartoning system, are known to cause, in some instances, a skewing of the carton C by the imposed frictional force acting against the carton C, especially adjacent the flap $F_1$.

Thus, to solve this problem, the stepper motor $M_5$ is independently increased in speed so that this skewing action is compensated. In other words, the increased speed of the upper feed belt 42b causes additional forward feeding force by an amount just sufficient to bring the cover of each successive carton into proper registry with the bottom of the carton. As the belt 42b moves faster than the opposite side upper belt 42a, the controlled slippage and thus the necessary frictional force, is gauged in order to exactly match that amount needed to provide this registration function. The integrity of proper shape of the carton C is maintained, and proper squaring of the carton prior to entry into the carton flow path of the conveyor section 13 is provided (see FIG. 3A).

As each successive carton C moves to the exit end of the lower belts 40, a light beam generated by light source 47 is broken triggering a photocell 48 to provide a signal through a suitable delay means 49 to the microprocessor P. The microprocessor P selects the appropriate retarding finger 22 to be extended.

The operation of the side running chain 21 with its extensible fingers 22 can best be understood by reference to FIG. 1 and FIGS. 4A–4C. The stepper motor $M_1$ is controlled and synchronized with the servo motor $M_2$ so that the chain 21 moves in its endless path at a slightly slower speed than the O-ring belt 30 adjacent the first side 13a of the carton flow path.

Any suitable electrical means can be employed to actually extend the proper finger 22, such as a rapid firing solenoid 50. In FIG. 4A, the finger 22, illustrated in the A position, is just coming into engagement with armature 51 of the solenoid 50, and is thus ready for extension into the edge of the carton flow path. The armature 51 is normally withdrawn away from the path of the fingers 22 by a compression spring 52. Of course, the microprocessor P and the integral delay means 49 are properly programmed through the operator/machine interface I. The majority of the fingers 22 are not chosen to retard a carton C at any particular time, and these thus remain in the retracted position. On the other hand, each finger 22 chosen for turning assist is extended on the fly in synchronized fashion into the edge of the carton path just in front of the arriving carton C. This action allows the assist in the turning function to be carried out in a controlled and smooth manner not heretofore possible.

Each of the fingers 22 is mounted on a pivot pin 60 extending upwardly from one of the pivotal joints of the chain 21. The pivot pin is positioned at an apex of the generally V-shaped configuration of the finger 22; an inside portion 61 of the finger being engagable by the armature 51 of the solenoid 50 and an outside portion 62 being that portion that is extensible into the path edge for capturing the carton corner.

As illustrated, the outside portion of each finger 22 includes depending inner and outer guide fins 63, 64, which cooperate with an upstanding elongated track 65. As illustrated, the track 63 extends along the intermediate conveyor section 13 adjacent the straight operative run of the chain 21. Each of the fingers 22 that is not selected for capture of a carton corner is maintained in a retracted position by the depending fins 63, 64 straddling the track 65. A tapered entry portion 65a helps to guide the fins 63, 64 to the proper position. When chosen, the finger 22 is kicked outwardly by the operation of the solenoid 50, so that the fin 63 extends over the entry portion 65a, whereby the finger 22 is now locked into the extended position due to the engagement of the inside of the fin 63 with the outside of the track 65. This lock into the extended position continues until the end of the track 65 is reached at the opposite end of the operative run where the finger is cammed back into the retracted position.

Thus in operation, it can be seen that the finger 22 positioned at the Z position of FIG. 4A remains in the retracted position since the depending fins 63, 64 are positioned in a straddling relationship on opposite sides of the track 65. However, the finger 22 in position A, just commences extension by the outward kick of the solenoid 50. The next in-line finger 22 at position B remains retracted since as soon as the armature 51 kicks the finger 22 outwardly, the spring 52 causes it to be quickly withdrawn. This is illustrated in FIG. 4B where the armature 51 is fully ejected and the finger 22 (in the position A) is fully extended in the outward direction. Then considering FIG. 4C, the depending inner fin 63 is shown positioned on the outside of the entry portion 65a of the track 65, and thus along the entire operative run it remains extended into the flow path for performing its function of capturing the inside corner of the designated carton C. Since the armature 51 is fully withdrawn, the trailing finger 22 at position B necessarily remains in its retracted condition with the depending fins 63, 64 positioned on opposite sides of the tracks 65.

In operation of the feeding/turning apparatus 10 of the present invention, and specifically with regard to the corresponding method of the present invention, it will be realized that each of the successive cartons C is handled in a highly efficient manner during the transition between the in-line infeed conveyor 11 and the take away conveyor 12. Supporting the cartons C along their bottom at laterally spaced locations are the O-ring belts 30 providing the composite feeding/turning action in an exceptionally controlled and smooth way. Each successive belt 30 moves with progressively increasing velocity providing the necessary differential speed that induces the positive forward feeding, and as well the turning of the carton C about its vertical axis Z. The finger 22 moving at a slightly slower speed than the O-ring belt 30 at the adjacent support location of the carton C, assists in the turning. This slower speed means that the carton C always moves forward along the carton flow path at least until such time as the finger 22 is positively engaged, thereby assuring that the finger 22 actually assists in each turning operation.

Advantageously, the O-ring belts 30 provide bottom contact with each carton C along substantially continuous lines at the spaced support locations across the carton. This a provides better frictional feeding forces, but at the same time allowing the gentle, controlled, relative sliding movement of the carton C across these contact lines as the carton C is turned.

In summary, it can now be realized that the results and advantages of the present invention substantially advance the state-of-the-art for lugless carton handling, turning and closing. Each of the successive cartons C from the infeed conveyor 11 is fed forward and efficiently turned in a particularly smooth, controlled way by operation of the differential speed O-ring belts 30. A separate side running chain 21 having a plurality of extensible fingers is operative to gently assist in the turning function. The finger 22 designated to extend into the carton flow path is determined by sensing of the leading edge of the carton C by the photocell 48. Upstream of this position, the integrity of the carton C and its squaring along the axis of the infeed conveyor 11 is assured by operation of the upper feed belts 42a, 42b at a differential speed, as required. The microprocessor P controls all of the stepper/servo motors $M_1$–$M_6$, either in concert or independently. Advantageously, the servo motor $M_2$ drives all of the O-ring belts 30 at the right speed through the use of the increasing diameter pulleys 25 and the common drive shaft 26. The belts 30 engage the bottom of the cartons C along multiple lines of contact, rather than at spaced point contact, for better combined feeding/turning action of the carton C.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. An apparatus for feeding and turning successive cartons during transition between in-line infeed and take away conveyors comprising an intermediate conveyor section in between said conveyors defining a substantially horizontal flow path with first and second sides;

a plurality of drive elements laterally spaced and extending in-line along said path underneath said cartons for feeding and turning of said cartons;

retarding means positioned along the edge of said first side of said path to engage an adjacent corner of each carton to assist the turning action during the forward feeding;

progressive driving means for said elements providing a differential speed across said path for the combined positive feeding and turning of the cartons;

said driving means comprising a first variable speed motor for driving said retarding means, said progressive driving means including a second variable speed motor for driving said elements, a third variable speed motor for driving at least one of said conveyors;

said driving means operating to relatively drive said elements from slow adjacent said first side of said path to fast along the second side;

and computer means connected to said motors for independently controlling said motors to provide optimum timing and efficient operation;

whereby said elements positively feed/turn said cartons long said path while said retarding means assists in turning.

2. The carton feeding/turning apparatus of claim 1, wherein said first and third motors are stepper motors and said second motor is a servo motor.

3. The carton feeding/turning apparatus of claim 2, wherein said drive elements comprise endless belts with the operative runs of said belts defining said intermediate conveyor section and said horizontal flow path, a separate pulley for driving each belt along its endless loop, a common shaft for said pulleys driven by said servo motor; the pulley for each successive belt from adjacent said first side of the flow path to the second side being progressively larger to provide the differential speed.

4. The carton feeding/turning apparatus of claim 3, wherein said belts are elastomeric O-rings for positive gripping action against the bottom of said cartons.

5. The carton feeding/turning apparatus of claim 4, wherein said intermediate conveyor section is further defined by a substantially flat plate, a series of grooves extending longitudinally along the flow path, each of said O-rings having its operative run seated in a mating groove for positive guiding action.

6. The carton feeding/turning apparatus of claim 1, wherein said infeed conveyor includes two parallel upper and two parallel lower belts for conveying said cartons, and guide means engaging each carton as it moves along said conveyor, a fourth and fifth motor for independently driving said upper belts, said computer means connected to said fourth and fifth motors for independently controlling the speed of each, whereby any skewing action of the cartons caused by said guide means can be compensated for squaring each carton upstream of said intermediate conveyor section by differential speed control of said fourth and fifth motors.

7. An apparatus for feeding and turning successive cartons during transition between in-line infeed and take away conveyors comprising an intermediate conveyor section in between said conveyors defining a substantially horizontal flow path with first and second sides;

a plurality of drive elements laterally spaced and extending in-line along said path underneath said cartons for feeding and turning of said cartons;

retarding means positioned along the edge of said first side of said path to engage an adjacent corner of each carton to assist the turning action during the forward feeding;

said retarding means comprising an endless member defining a substantially horizontal plane parallel to said flow path and a substantially straight operative run along said edge of the first side of the flow path;

a plurality of extensible fingers on said member for engaging said adjacent corner of the selected carton along the path;

means for actuating a selected one of said fingers to extend it into the edge of said path for capturing the carton corner;

and sensor means positioned along said infeed conveyor for selecting said one of said fingers for assisting in the carton turning action;

progressive driving means for said elements providing a differential speed across said path for the combined positive feeding and turning of the cartons;

said driving means operating to relatively drive said elements from slow adjacent said first side of said path to fast along the second side;

whereby said elements positively feed/turn said cartons along said path while said retarding means assists in turning.

8. The carton feeding/turning apparatus of claim 7, wherein said endless member includes a chain, a pivot pin for mounting each finger on said chain, and said actuating means includes an electrical kicker to rapidly impact the selected finger for extending into the edge of the path in the desired timed manner.

9. The carton feeding/turning apparatus of claim 8, wherein said kicker comprises a solenoid having an armature for rapidly projecting into the path of the selected finger for actuation.

10. The carton feeding/turning apparatus of claim 8, wherein each finger is substantially V-shaped and mounted on its pivot pin at the apex, an inside portion being engagable by the kicker and the outside portion being extensible into the path edge for capturing the carton corner.

11. The carton feeding/turning apparatus of claim 10, wherein the underside of said outside portion of said finger includes depending inner and outer guide fins, an upstanding elongated track on said intermediate conveyor section extending along the straight operative run of said chain for straddling by said fins to retain the selected finger in the retracted position, and an entry portion of said track positioned substantially opposite said kicker to allow both fins on said finger to move past said track upon actuation of said solenoid and guiding of the selected finger by the inner fin into the path edge for capturing the carton corner.

12. A method for feeding and turning successive cartons during transition as the cartons move between in-line infeed and take away conveyors comprising the steps of:

providing a substantially horizontal flow path with first and second sides between said conveyors;

supporting along said flow path the bottom of each successive carton at laterally spaced locations;

moving a portion of each carton at each support location in a progressively increasing manner from the first to the second side of the flow path so as to provide a differential speed across the path for combined positive feeding and turning of the cartons;

engaging the bottom of said carton along substantially continuous lines at said spaced locations for moving said carton at the differential speed across said path;

sensing the leading edge of each successive carton adjacent the downstream end of said infeed conveyor;

extending said finger into said flow path along said edge of the first side in response thereto;

engaging the leading corner of each carton by a moving finger along the edge of said first side of said path;

moving said finger at a slightly slower speed than the speed at the support location adjacent said edge along said first side to assist in turning by retarding the movement of this portion of the carton relative to the remaining portions;

whereby to provide improved feeding/turning of said cartons along said path while assisting in turning by retarding the portion of the carton along said edge of the first edge of the flow path.

13. A method for feeding and turning successive cartons during transition as the cartons move between in-line infeed and take away conveyors comprising the steps of:

providing a substantially horizontal flow path with first and second sides between said conveyors;

squaring each successive carton upstream of said flow path;

supporting along said flow path the bottom of each successive carton at laterally spaced locations;

moving a portion of each carton at each support location in a progressively increasing manner from the first to the second side of the flow path so as to provide a differential speed across the path for combined positive feeding and turning of the cartons;

engaging the leading corner of each carton by a moving finger along the edge of said first side of said path;

moving said finger at a slightly slower speed than the speed at the support location adjacent said edge along said first side to assist in turning by retarding the movement of this portion of the carton relative to the remaining portions;

whereby to provide improved feeding/turning of said cartons along said path while assisting in turning by retarding the portion of the carton along said edge of the first edge of the flow path.

14. An apparatus for feeding and turning successive cartons through a substantially 90° angle during substantially continuous transition between in-line infeed and take away conveyors comprising:

an intermediate conveyor section in between said conveyors defining a substantially horizontal flow path with first and second sides;

a plurality of drive elements laterally spaced and extending in-line along substantially the full length of said path underneath said cartons for feeding and full turning of said cartons through said angle;

retarding means positioned along substantially the full length of the edge of said first side of said path to engage an adjacent corner of each carton to combine with said drive elements for the full turning action during the forward feeding along said path;

progressive driving means for said elements providing a differential speed across said path for the combined positive, substantially continuous and progressive feeding and turning of the cartons;

said driving means operating to relatively drive said elements substantially continuously from slow adjacent said first side of said path to fast along the second side;

whereby said elements positively feed/turn said cartons along substantially the full length of said path while said retarding means combines with said elements in full turning.

15. A method for feeding and turning successive cartons through a substantially 90° angle during substantially continuous transition as the cartons move between in-line feed and take away conveyors comprising the steps of:

providing a substantially horizontal flow path with first and second sides between said conveyors;

supporting along substantially the full length of said flow path the bottom of each successive carton at laterally spaced locations;

moving a portion of each carton at each support location in a progressively increasing manner from the first to the second side of the flow path so as to provide a differential speed across the path for combined positive feeding, and full, substantially 90° and continuous turning of the cartons;

engaging the leading corner of each carton by a moving finger along the edge of said first side of said path;

moving said finger at a slightly slower speed than the speed at the support location adjacent said edge along said first side to combine in the full turning by retarding the movement of this portion of the carton relative to the remaining portions;

whereby to provide substantially continuous feeding/ substantially 90° turning of said cartons along said path while combining in said turning by retarding the portion of the carton by said finger along substantially the full length of the first edge of the flow path.

16. The method of feeding/turning successive cartons in accordance with claim 15, wherein said supporting step includes engaging the bottom of said carton along substantially continuous lines at said spaced locations for moving said carton at the differential speed across said path along substantially the full length of said flow path;

whereby improved feeding/turning action is provided.

17. A method for feeding and turning successive cartons through 90° during transition as the cartons move along a flow path between in-line infeed and take away conveyors comprising the steps of:

turning each successive carton about a vertical axis through at least a full 90° as the carton is simultaneously being substantially continuously fed in a forward direction along substantially the full length of said flow path by applying separate feeding forces of increasing speed at spaced locations from a first side to a second side of said flow path to provide a differential speed across said path; and retarding a leading corner of each successive carton along substantially the full length of the flow path adjacent the edge of said first side of said path to combine in the turning function.

18. The method of feeding/turning successive cartons in accordance with claim 17, wherein the retarding step is carried out at a slightly slower speed than the forward feeding speed adjacent substantially the full length of the edge of said first side.

19. The method of feeding/turning successive cartons in accordance with claim 17, wherein said feeding forces are applied along substantially continuous lines along substantially the full length of said spaced locations.

20. An apparatus for feeding and turning successive cartons through a substantially 90° angle during substantially continuous transition between in-line infeed and take away conveyors comprising:

an intermediate conveyor section in between said conveyors defining a substantially in-line horizontal flow path with first and second sides;

a plurality of drive elements laterally spaced and extending in-line along substantially the full length of said path underneath said cartons for feeding and turning of said cartons through said angle;

retarding means positioned along substantially the full length of the edge of said first side of said path to engage an adjacent corner of each carton to combine with said elements to provide the turning action during the forward in-line feeding;

progressive driving means for said elements providing a differential speed across said path for the combined positive and progressive in-line feeding and turning of the cartons;

said driving means operating to relatively drive said elements from slow adjacent said first side of said path to fast along the second side;

whereby said elements positively feed/turn said cartons along substantially the full length of said path while said retarding means combines with said elements in full turning.

* * * * *